United States Patent [19]

Millard

[11] Patent Number: 4,619,219

[45] Date of Patent: Oct. 28, 1986

[54] PRESSURE RELEASE SAFETY ANTENNA

[76] Inventor: Steven L. Millard, 1576 Wardman Dr., Brea, Calif. 92621

[21] Appl. No.: 649,802

[22] Filed: Sep. 12, 1984

[51] Int. Cl.⁴ .......................... G09F 17/00; B60Q 9/00

[52] U.S. Cl. .................................. 116/28 R; 116/173; 52/99; 52/110; 248/539; 248/548

[58] Field of Search ............. 116/28 R, 209, 173–175, 116/63 R; 40/586, 590, 591, 598, 601, 602, 608, 607, 610; 52/98, 99, 110; 404/10, 11; 248/539, 548, 900; 215/101

[56] References Cited

U.S. PATENT DOCUMENTS

| | | | |
|---|---|---|---|
| 1,090,573 | 3/1914 | Shaner | 248/539 |
| 1,171,487 | 2/1916 | Waters | 215/101 |
| 2,146,654 | 2/1939 | Shea et al. | 248/539 |
| 2,397,151 | 3/1946 | Mitchell | 52/110 |
| 3,438,651 | 4/1969 | Hertoghe et al. | 116/173 |
| 3,838,661 | 10/1974 | Medley, Jr. | 116/63 P |
| 4,373,464 | 2/1983 | Blau | 116/63 R |
| 4,557,449 | 12/1985 | Davidson et al. | 248/160 |

FOREIGN PATENT DOCUMENTS

| | | | |
|---|---|---|---|
| 515989 | 12/1952 | Belgium | 116/63 R |
| 434411 | 10/1967 | Switzerland | 52/98 |

*Primary Examiner*—Charles Frankfort
*Assistant Examiner*—W. Morris Worth
*Attorney, Agent, or Firm*—Lyon & Lyon

[57] ABSTRACT

A pressure releasable safety antenna for off-road vehicles comprising an antenna mounted within the upper portion of a pressure releasable mounting assembly, the lower portion of the assembly being mounted on the vehicle and the upper portion being snapped within the lower portion, the upper portion releasing from within the lower portion upon the application of a lateral force on the antenna.

10 Claims, 4 Drawing Figures

PRESSURE RELEASE SAFETY ANTENNA

FIELD OF INVENTION

This invention relates to the field of safety antennas utilized to improve the visibility of vehicles. In particular this invention relates to the field of safety antennas for off-road vehicles.

BACKGROUND OF INVENTION

This invention provides a pressure release safety antenna for use with off-road vehicles which substantially reduces or eliminates the breakage of standard safety antennas upon the overturning of the vehicle. Safety antennas have long been used by drivers of off-road vehicles, such as all terrain vehicles or dune buggies, to improve the visibility of the vehicle, especially in hilly terrain. Previous safety antennas have traditionally consisted of a fiberglass pole rigidly mounted on the off-road vehicle's frame or body, the pole having a red flag or other attention attracting means fastened to its top. These safety antennas traditionally have a length sufficient to allow the flag mounted atop the pole to become visible prior to the off-road vehicle coming over a knoll or hilltop. The use of such safety flags helps assist individuals in the vicinity of the user of the off-road vehicle in locating the whereabouts of the vehicle with adequate time to avoid the oncoming vehicle.

Prior safety antennas have all suffered from a common short fall. These antennas are utilized on vehicles, such as all terrain vehicles or dune buggies, wherein the incidents of vehicle overturning or rollover is quite high. Commonly when the off-road vehicle is overturned the standard safety antennas utilized up until now have usually been broken or otherwise snapped off of the vehicle. This shortfall results in the frequent need to replace the safety antenna at a considerable expense to the vehicle owner.

A need therefore exists for a safety antenna having a release means whereby upon the accidental overturning of the off-road vehicle the safety antenna will release rather than become broken as is commonly the case with existing safety antennas.

SUMMARY OF INVENTION

This invention is a pressure release safety antenna for use on off-road vehicles. The invention consists of a safety antenna mounted on an off-road vehicle by means of a pressure release mounting assembly. The mounting assembly includes an upper and lower sections. The safety antenna is mounted within the upper section, and the lower section is bolted to the off-road vehicle body or frame. The upper section containing the safety antenna snaps within the lower section. When the off-road vehicle overturns and pressure is exerted laterally against the safety antenna, prior to the pressure reaching the breaking point pressure of the safety antenna, which is preferably constructed from fiberglass, the upper section will separate from the fixed lower section thereby allowing the upper section and safety antenna to be released prior to breaking of the antenna. Upon the righting of the vehicle the upper section may be manually snapped back into place within the lower section and the safety antenna re-used. To avoid the accidental loss of the upper section and safety antenna a leash means connects the antenna to the bottom bracket so that during the release of the antenna the leash retains the antenna in close relationship with the body and prevents its accidental loss.

The present invention also allows for the intentional release of the safety antenna. During periods in which the off-road vehicle is in storage or is being transported, it is desirable to remove the safety antenna. Prior antennas which were rigidly mounted were difficult to remove. This invention can be removed either by releasing the entire assembly from its mounting on the vehicle or by snapping the antenna and upper section from their position within the lower section.

It is, therefore, an object of this invention to provide a pressure releasable safety antenna for off-road vehicles.

It is also an object of this invention to provide a safety antenna for off-road vehicles which can easily be removed during storage or transportation of the vehicle.

These and other objects and advantages will be apparent from the following description in conjunction with the drawings.

DETAILED DESCRIPTION

Figure 1:
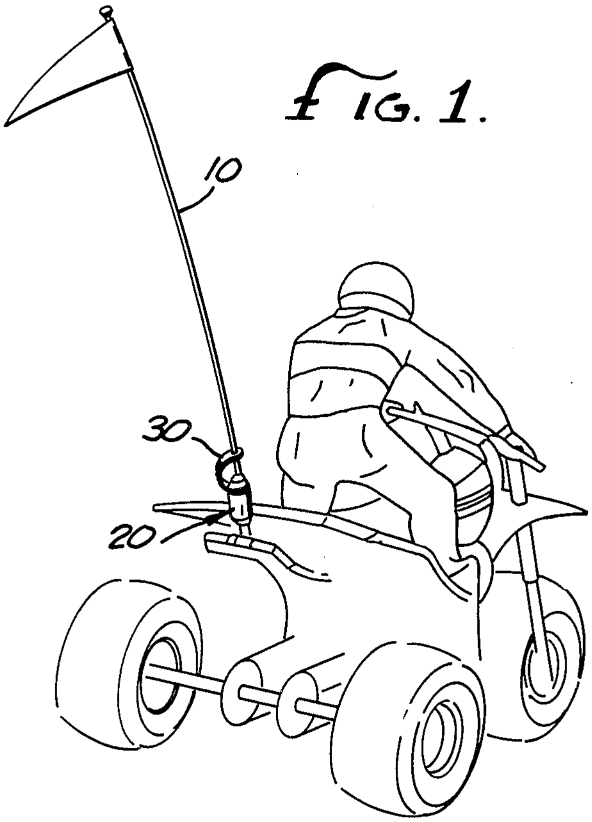
FIG. 1 is a perspective view showing the invention as mounted on an off-road vehicle.

The invention is shown in FIG. 1 mounted on an off-road vehicle. The safety antenna 10 is mounted on the vehicle by means of the pressure release mounting assembly 20. A safety leash 30 secures the antenna 10 to the mounting assembly 20.

Figure 2:
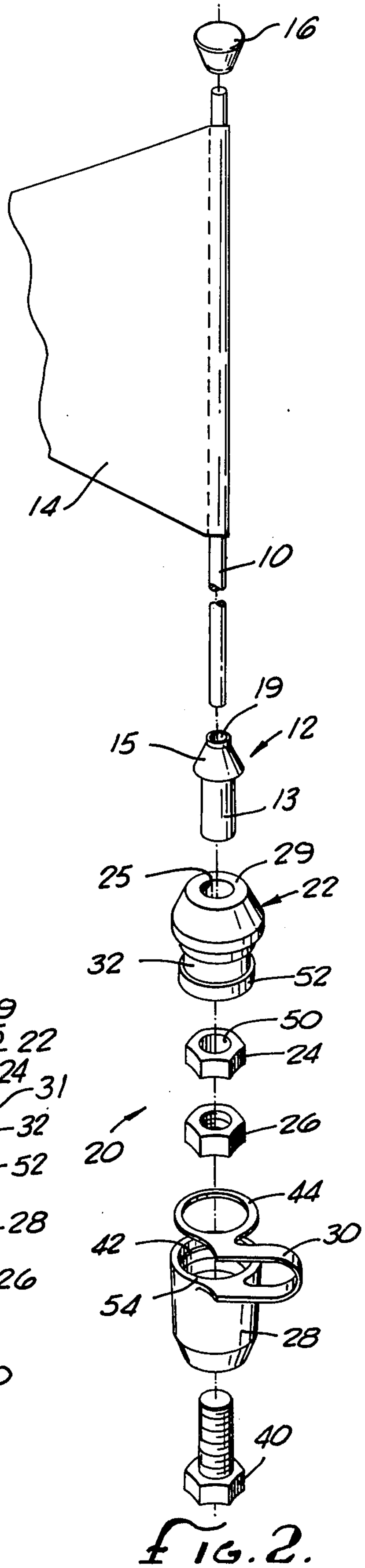
FIG. 2 is an exploded view of the invention.
Figure 3:
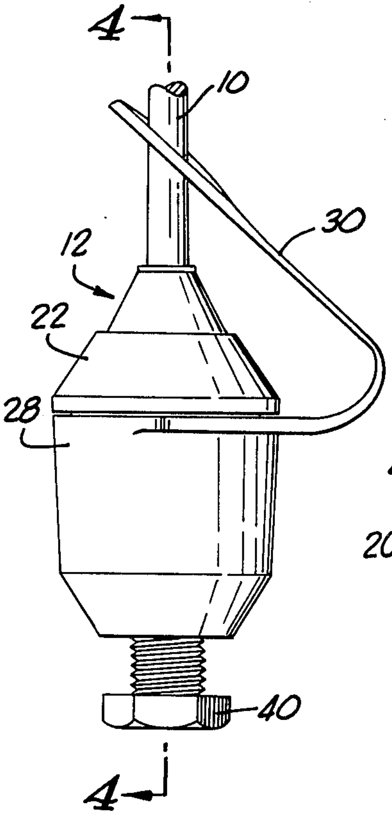
FIG. 3 is a side view of the pressure release mounting assembly.
Figure 4:
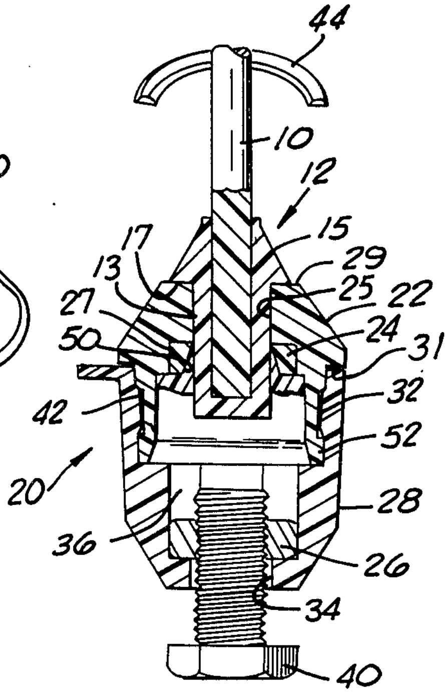
FIG. 4 is a cross-sectional view of the pressure release mounting assembly.

The individual components of the invention are shown in greater detail in FIGS. 2, 3 and 4. As shown in FIG. 2 the invention is comprised of a safety antenna 10, antenna support jacket 12, an upper pressure release mounting unit 22, an upper hexagonal nut 24, lower hexagonal nut 26, and lower pressure release mounting unit 28.

The safety antenna 10 is constructed from any suitable flexible material which will allow for the lateral movement or bending of the antenna without breaking. In the preferred embodiment the safety antenna is constructed from fiberglass. A safety flag 14 is fastened to the top of the antenna 10. The flag 14 may be of any shape, color or size adequately visible from a distance. The flag is attached to the antenna by any suitable means such as gluing with an adhesive or by sewing. A safety cap 16 is mounted atop the antenna 10. The cap 16 helps prevent the splinting of the end of the antenna.

The antenna 10 is mounted within the plastic support jacket 12. As shown in FIGS. 2 and 4 the support jacket 12 has a lower cylindrical section 13 and upper conical shaped support section 15. A shoulder 17 joins the cylindrical section 13 and the support section 15. The antenna 10 is pressed within a recess 19 in the center of the support jacket 12. To insure a permanent fit between the antenna 10 and support jacket 12 a small amount of suitable adhesive may be applied to either the end of the antenna 10 or the inside of the recess 19 prior to the insertion of the antenna 10 into the support jacket 12. The support jacket 12 provides support for the base of the antenna 10 and helps prevent splintering or shattering of the antenna 10 during bending.

The support jacket 12 is then press-fitted within the upper pressure release mounting unit 22. As shown in FIG. 2 and 4 the upper pressure release mounting unit 22 has a general cylindrical configuration. In the preferred embodiment it is a single piece injection molded out of polypropylene manufactured by Hercules and sold under the stock number SB 786. It is to be noted, however, that the unit 22 may be manufactured by other means such as blow molding, die casting or lathe cutting. The inventor has found that this particular polypropylene provides the greatest durability over a wider ambient temperature range. The temperature range over which the polypropylene must adequately function is critical due to the wide variety of conditions off-road vehicles are operated under. These range from snowmobiles operated in sub-zero temperatures to all terrain vehicles operated in the extreme heat of the deserts. While this particular polypropylene has been found to have the optimum characteristics, other grades of polypropylene or other plastics or rubber materials may successfully be used. The upper pressure release mounting unit 22 has a cylindrical opening 25 at its upper end. The cylindrical opening expands into a larger diameter hexagonal recess 27 on the inside of the mounting unit 22 as shown in FIG. 4. The support jacket 12 is press fitted within the opening 25 until the shoulder 17 of the jacket 12 abuts the upper surface 29 of the mounting unit 22. The cylindrical section 13 of the jacket extends inward within the hollow center section of the mounting unit 22 as shown in FIG. 4. The upper hexagonal nut 24 is then pressed over the end of the support jacket 12 and pressed into the hexagonal recess 27 cast into the unit 22. In the preferred embodiment the nut 24 is constructed from a plastic material. As shown in FIG. 4 the aperture 50 through the hexagonal nut 24 is not threaded and is tapered. The diameter of the aperture 50 expands outward from the upper end of the nut. Any suitable adhesive is then poured within the taper of the hexagonal nut 24 thereby bonding together the support jacket 12 and the nut 24. This prevents unwanted rotation of the support jacket 12 within the mounting unit 22 which might eventually lead to displacement of the jacket from the unit. The support jacket 12 and the hexagonal nut 24 may also be joined together by alternate means such as sonic welding or heat staking.

As shown in FIG. 4 the exterior of the upper portion of the mounting unit 22 has a conical configuration. The lower portion of the mounting unit 22 is a cylindrical section 52 recessed from the outer edge of the conical section thereby forming a shoulder 31. A pressure release channel 32 is recessed in the outer wall of the cylindrical section 52.

The lower pressure release mounting unit 28 is also injection molded from polypropylene. The lower unit 28 is essentially a hollow cylinder, having an upper cylindrical chamber connected to a lower hexagonal shaped chamber 36 the hexagonal chamber 36 being connected to the exterior of the unit 28 by means of an aperture 34 in the bottom of the lower unit 28. A standard threaded steel hexagonal nut 26 is inserted within the hexagonal chamber 36. The lower unit 28 is then mounted on the off-road vehicle by means of a bolt 40 which can be inserted through the vehicle's body or frame or a mounting bracket and threaded through the hexagonal nut 26. The upper pressure release unit 22 may then be snapped into the lower pressure release unit 28. As shown in FIG. 4 a pressure release ridge 42 extends inwardly from the interior wall of the upper chamber. The ridge is aligned with and coresponds to the pressure release channel 32 in the upper unit 22. When the upper unit 22 is snapped into the lower unit 23 the shoulder 31 abuts the upper surface 54 of the unit 28 and the pressure release ridge 42 rests within the pressure release channel 32. This interlocking of the ridge and channel prevents the undesired removal of the upper unit 22.

A safety leash 30 is encircles the antenna 10. As shown in FIG. 2 and 3 the leash 30 is an integral part of the lower pressure release mounting unit 28 and has a circular ring 44 located at its distal end. Prior to the upper unit 22 being snapped into the lower unit 28 the antenna 10 is inserted through the ring 14.

When the safety antenna 10 is mounted on the off-road vehicle the flag 14 alerts individuals of the vehicle's approach. Should the vehicle overturn a lateral force is exerted on the antenna 10 as it contacts the ground. As this force is increased during the overturning of the vehicle a moment is created about the base of the antenna 10. This moment causes the wall of the lower pressure release unit 28 opposite the force to flex slightly outward thereby allowing the channel 32 on the opposite side to pull free of the ridge 42. This results in the release of the upper unit 22 from the lower unit 28 at a pressure level below that of the breaking point of the antenna 10. The safety leash 30 which is connected to the antenna 10 then prevents the loss of the antenna 10 by keeping it in contact with the vehicle.

Having thus described one embodiment of my invention in detail, it is to be understood that numerous equivalents and alterations which do not depart from the invention will be apparent to those skilled in the art, given the teaching herein. Thus, my invention is not to be limited to the above description, but is to be of the full scope of the appended claims.

What is claimed is:

1. A reusable pressure releasable safety antenna for off-road vehicles comprising:

an elongated member, said elongated member having a visibility enhancement means mounted thereon, a pressure releasable mounting assembly, said mounting assembly having an upper section and a lower section, a leash, and a means for connecting the lower section of the pressure releasable mounting assembly to the off-road vehicle, wherein the elongated member is connected to the upper section of the pressure releasable mounting assembly, which upper section is in turn pressure releasably connected to the lower section of the pressure releasable mounting assembly, thereby preventing accidental loss of said safety antenna, and further wherein the leash is connected at one end to the lower section of the pressure releasable mounting assembly, the opposite end of the leash being connected to the elongated member, said upper section separating from said lower section before pressure exerted on said elongated member reaches the breaking point pressure of said elongated member.

2. A pressure releasable safety antenna as in claim 1 wherein the elongated member is connected to the upper section of the pressure releasable mounting assembly by means of a support jacket, an end of said elongated member being inserted within said support jacket which is, in turn, inserted within said upper section.

3. The pressure releasable safety antenna as in claim 1 wherein the elongated member is constructed from fiberglass.

4. The pressure releasable safety antenna of claim 1 wherein the upper and lower sections of the pressure releasable mounting assembly are constructed from polypropylene.

5. A reusable pressure releasable safety antenna for off-road vehicles comprising:

an elongated member, said elongated member having a visibility enhancement means connected thereto, a pressure releasable mounting assembly, said mounting assembly having an upper section and a lower section, a leash, and a means for connecting the lower section of the pressure releasable mounting assembly to the off-road vehicle, wherein said elongated member is connected to the upper section of the pressure releasable mounting assembly, said upper section having a channel circumscribing an exterior surface, said upper section being inserted within a recess in the interior of the lower section of the pressure releasable mounting assembly, the lower section having a ridge circumscribing the interior wall of the lower section, the ridge interlocking with the channel in the upper section when the upper section is properly inserted within the lower section, thereby preventing accidental loss of said safety antenna, and further wherein the leash is connected at one end to the lower section of the pressure releasable mounting assembly, the opposite end of the leash being connected to the elongated member, said upper section separating from said lower section before pressure exerted on said elongated member reaches the breaking point pressure of said elongated member.

6. The pressure releasable safety antenna of claim 5 wherein the elongated member is constructed from fiberglass.

7. The pressure releasable safety antenna of claim 5 wherein the upper and lower sections of the pressure releasable mounting assembly are constructed from polypropylene.

8. The pressure releasable safety antenna of claim 5 wherein the elongated member is connected to the upper section of the pressure releasable mounting assembly by means of a support jacket, one end of the elongated member being fitted within the jacket, said jacket in turn being press fitted within the upper section.

9. The pressure releasable safety antenna of claim 8 wherein a nut is fitted over the end of the support jacket within a recess in the interior of the upper section, said recess having the same configuration as the external configuration of the nut, said nut having a tapered aperture along its central axis, the cross-sectional area of said aperture increasing from the top to the bottom of the nut, said nut being bonded to the support jacket by filling the tapered aperture with adhesive.

10. The pressure releasable safety antenna of claim 5 wherein the means for connecting the lower section of the pressure releasable mounting assembly to the vehicle is comprised of a nut fitted within a recess in the interior of the lower section, said nut having the same external configuration as the recess, the threaded aperture of the nut being connected to the exterior of the lower section by means of a co-axially aligned hole in the bottom of the lower section and a bolt which is connected to the vehicle and is threaded into the nut.

* * * * *